United States Patent Office.

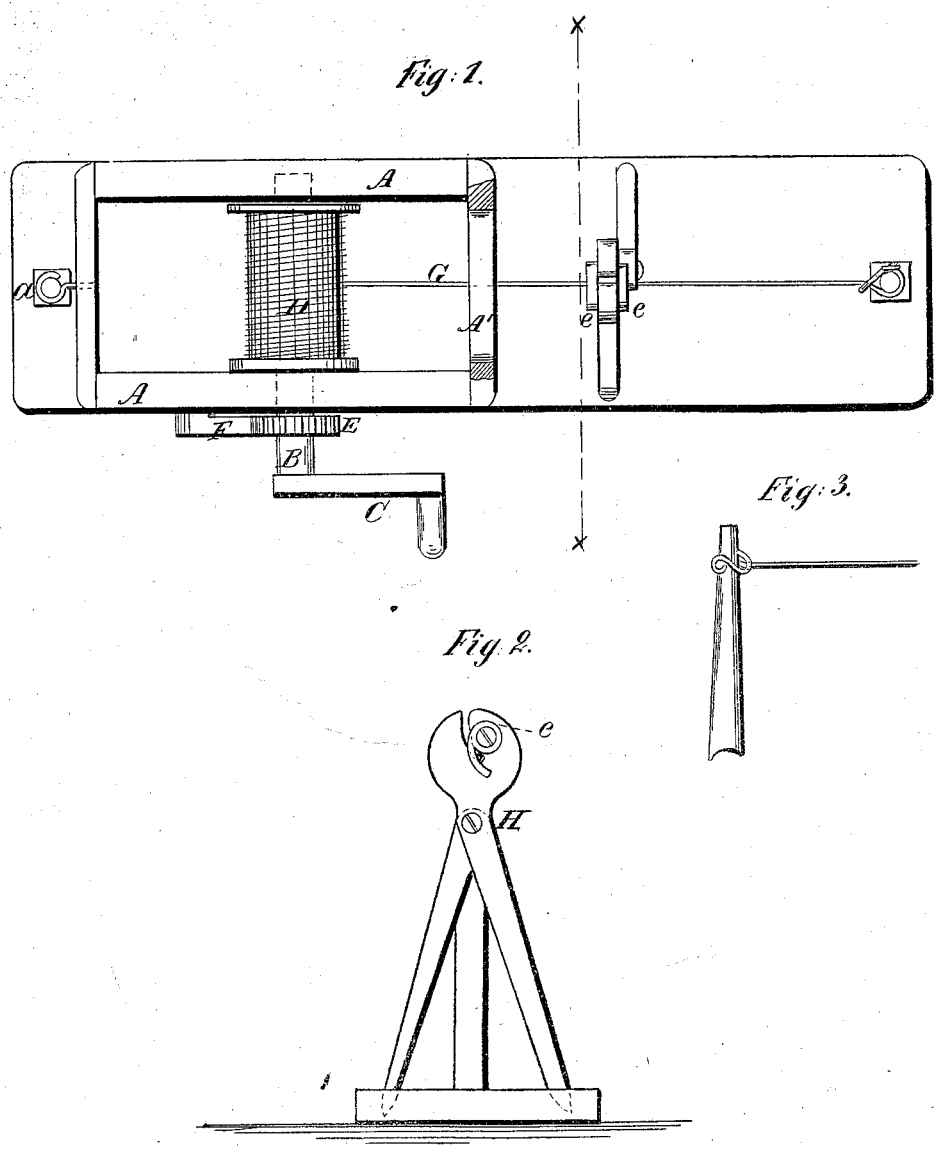

R. WHITE, OF DECATUR, ILLINOIS.

Letters Patent No. 70,057, dated October 22, 1867.

IMPROVEMENT IN CORD-STRETCHER.

*The Schedule referred to in these Letters Patent and making part of the same.*

TO ALL WHOM IT MAY CONCERN:

Be it known that I, R. WHITE, of Decatur, in the county of Macon, and State of Illinois, have invented a new and improved Cord-Stretcher and Supporter; and I do hereby declare that the following is a full, clear, and exact description thereof, which will enable those skilled in the art to make and use the same, reference being had to the accompanying drawings, forming part of this specification.

This invention relates to a new and improved arrangement for stretching cords, ropes, and cables; and the invention consists in providing a windlass, which is operated by a crank in a suitable frame, and also in a supporter whereby the cable or rope is held in a horizontal position while it is being stretched, and in the peculiar formation thereof, as will be hereinafter described.

Figure 1 is a top view of the stretcher, showing the different parts of which it is composed, and also the top end of the supporter.

Figure 2 is a vertical section through the line $x$ $x$, looking from the windlass-frame, showing the supporter in place.

Figure 3 represents the cord or rope attached to a hold-fast at one end.

Similar letters of reference indicate corresponding parts.

A represents a rectangular-shaped frame, of suitable size and strength, which is attached to a hold-fast at its back end, as seen in the drawing at $a$. The shaft B of the windlass is provided with a drum, around which the cord or rope is wound, as seen in the drawing. This shaft is supported by the frame A, in suitable boxes, with one end projecting, to which a crank is attached which is marked C. D is the windlass-drum. E is the ratchet-wheel on the shaft B. F is the ratchet-pawl. G is the rope or cord to be stretched. The end piece of the frame marked A' is slotted for the rope to pass through, this piece being shown partly in section to show the slot. H is the supporter. It is made to stand upright, as represented, enclosing the rope in a slot. It may stand upon two legs, as seen, or upon three, like a tripod. For the purpose of keeping the rope or cord in place two circular hooks are attached to the head of the supporter, one upon each side, which are marked $e$. A pin or bolt passes through the head and through each hook. When the rope is in the slot in the head of the supporter, the hooks are turned down, as seen in fig. 2, thus holding it securely in its place.

What I claim as new, and desire to secure by Letters Patent, is—

The windlass B, supported in the frame A, in combination with the supporter H, when the same are constructed, arranged, and combined, substantially as described for the purposes set forth.

I claim the hooks $e$ in combination with the support H, as for the purposes described.

R. WHITE.

Witnesses:
D. S. FRYMIRE,
H. D. FRYMIRE.